United States Patent [19]

Cornish

[11] 4,099,456
[45] Jul. 11, 1978

[54] TREATMENT OF VEGETABLES

[75] Inventor: David John Cornish, Dereham, England

[73] Assignee: Dreibholz & Floering Limited, Dereham, England

[21] Appl. No.: 706,200

[22] Filed: Jul. 19, 1976

[30] Foreign Application Priority Data

Jul. 23, 1975 [GB] United Kingdom ............ 30724/75

[51] Int. Cl.² .......................................... A23N 15/01
[52] U.S. Cl. ................................. 99/638; 130/30 R; 99/643
[58] Field of Search ................................ 99/635–639, 99/643; 130/30 R; 426/481, 484, 518

[56] References Cited

U.S. PATENT DOCUMENTS

| 1,146,085 | 7/1915 | McVey | 99/545 |
| 2,506,802 | 5/1950 | Maghuson | 99/544 |
| 3,490,506 | 1/1970 | Guilford | 130/30 R |
| 3,874,280 | 4/1975 | Vadas | 99/544 |

Primary Examiner—Harvey C. Hornsby
Assistant Examiner—Robert Pous
Attorney, Agent, or Firm—Larson, Taylor and Hinds

[57] ABSTRACT

The invention provides apparatus for cutting for example florets from cauliflower heads or leaves from cabbages cleanly so as to avoid damage to the florets or leaves. As a tubular knife follows a path encircling the stalk, so a divider member parts the florets or leaves to facilitate a clean cut.

6 Claims, 5 Drawing Figures

TREATMENT OF VEGETABLES

BACKGROUND OF THE INVENTION

The invention concerns improvements in or relating to the treatment of vegetables or similar agricultural produce, in particular, but not exclusively, the cutting of cauliflowers to separate florets from the vegetable stalk or the division of cabbages with removal of the central stalk.

In the food processing industry it is necessary to cut vegetables or other agricultural produce into manageable portions for fresh produce sales, or canning or bottling purposes. In particular, the de-florettling of cauliflower has presented difficulty when carried out by a mechanical process, instead of a laborious manual task, because often the florets themselves are cut, instead of merely the side stalks joining them to the main stalk or core. Small pieces of floret or "crumbs" are thus included in the product which detract from its appearance.

BRIEF SUMMARY OF THE INVENTION

It is an object of the present invention to provide apparatus which, while particularly suitable for defloretting cauliflower heads with the minimum formation of crumbs, is also capable of treating other similar vegetables and the like. The invention therefore provides apparatus for the treatment of vegetables or similar agricultural produce having a central stalk or core bearing leaves, florets or the like, including a cutting member comprising an annular cutting edge surrounding an opening for the passage of the stalk or core wherein there is further provided a divider member having a projection extending therefrom so as to confront the opening in the cutting member, said projection being substantially circular in plan and comprising a central raised portion with side portions sloping outwardly therefrom, means to bring about relative movement between said cutting member and said divider member along a path lying parallel to the longitudinal axis of the annular cutting edge of the cutting member, an extension of said axis passing through the raised portion of the divider member, the construction and arrangement being such that in use, a cut end of the vegetable core enters the opening of the cutting member as the cutting edge progresses through the vegetable, whilst the divider member divides and deflects the leaves, florets or the like at an opposed region of the vegetable to cause the leaves, florets or the like to lie substantially radially of said axis.

Where convenient, the divider member may also be provided with further cutting edges extending radially of said axis to assist in the dividing of, for example, cabbages.

While the apparatus may conveniently be bench mounted, it is particularly advantageous if a plurality of cutting members and dividing members are mounted in a continuous production machine, for example, a machine for the treatment of vegetables comprising a loading station and a discharge station, conveying means adapted to convey produce between said loading and discharge stations, the conveying means comprising a plurality of produce receiving localities, each locality including an aperture provided with at least one cutting edge, a plurality of presser members each adapted to be aligned with one of the localities and to press the produce through the aperture of the locality, means to operate each of said presser members in turn when a locality aligned therewith approaches the discharge station, thereby causing the cutting edge(s), in use, to penetrate the produce at that locality so that cut portions of the produce are discharged at the discharge station. Conveniently the conveying means may be in the form of a rotary table, having a loading station and a discharge station.

It will be understood that the present invention may equally well be applied to a machine in which the cutting member is movable to approach the divider member, or vice versa, or in which the cutting member is arranged above the divider member, or beneath it.

It is convenient if the produce is supplied to the region of the loading station by further conveying means, cut portions of the produce being similarly conveyed from the discharging station to the next stage of treatment.

BRIEF DESCRIPTION OF THE DRAWINGS

There will now be described apparatus according to the present invention. It will be understood that the description, which is to be read with reference to the accompanying drawings, is given by way of example only and not by way of limitation.

In the drawings.

DETAILED DESCRIPTION OF THE DRAWINGS

Figure 1:
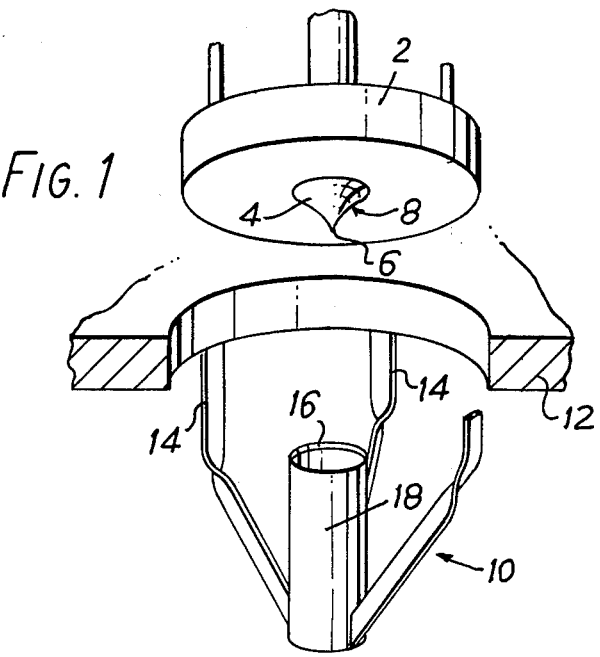
FIG. 1 is a perspective view of a divider member and a divider member and a cutting member of apparatus according to the present invention and particularly suited to the de-florettling of cauliflower.

FIG. 1 shows a divider member 2 having a centrally disposed, downwardly extending projection 4 comprising a central portion 6 having smoothly sloping, slightly concave sides 8. The projection is circular in plan and in the present example, the divider member is made of polythene.

A cutter member 10, suitably secured to a plate 12 by means of brackets 14, comprises an annular cutting edge 16 formed on one end portion of a tubular body portion 18 which provides passage for a core of a cauliflower.

Figure 2:
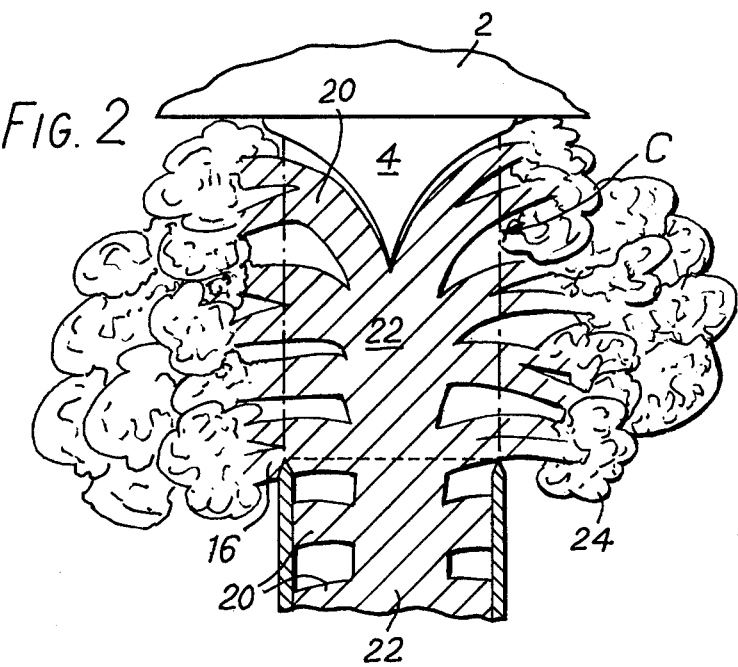
FIG. 2 is a schematic diagram illustrating the action of the apparatus on a cauliflower head.

In FIG. 2, the cutting edge 16 is shown having partially progressed in a cutting path C through the stalks 20 projecting from the cauliflower core 22 so as to remove florets 24. It will be seen that the divider member has meanwhile divided or parted the top florets so as to deflect their stalks sideways by means of the surface 8 so that they lie substantially radially of the cutting edge. Continued movement of approach severs all the floret stalks without damage to the florets themselves, which would cause "crumbs". It will be appreciated that the angle of the surface 8 determines the degree of parting and dividing which takes place.

Figure 3:
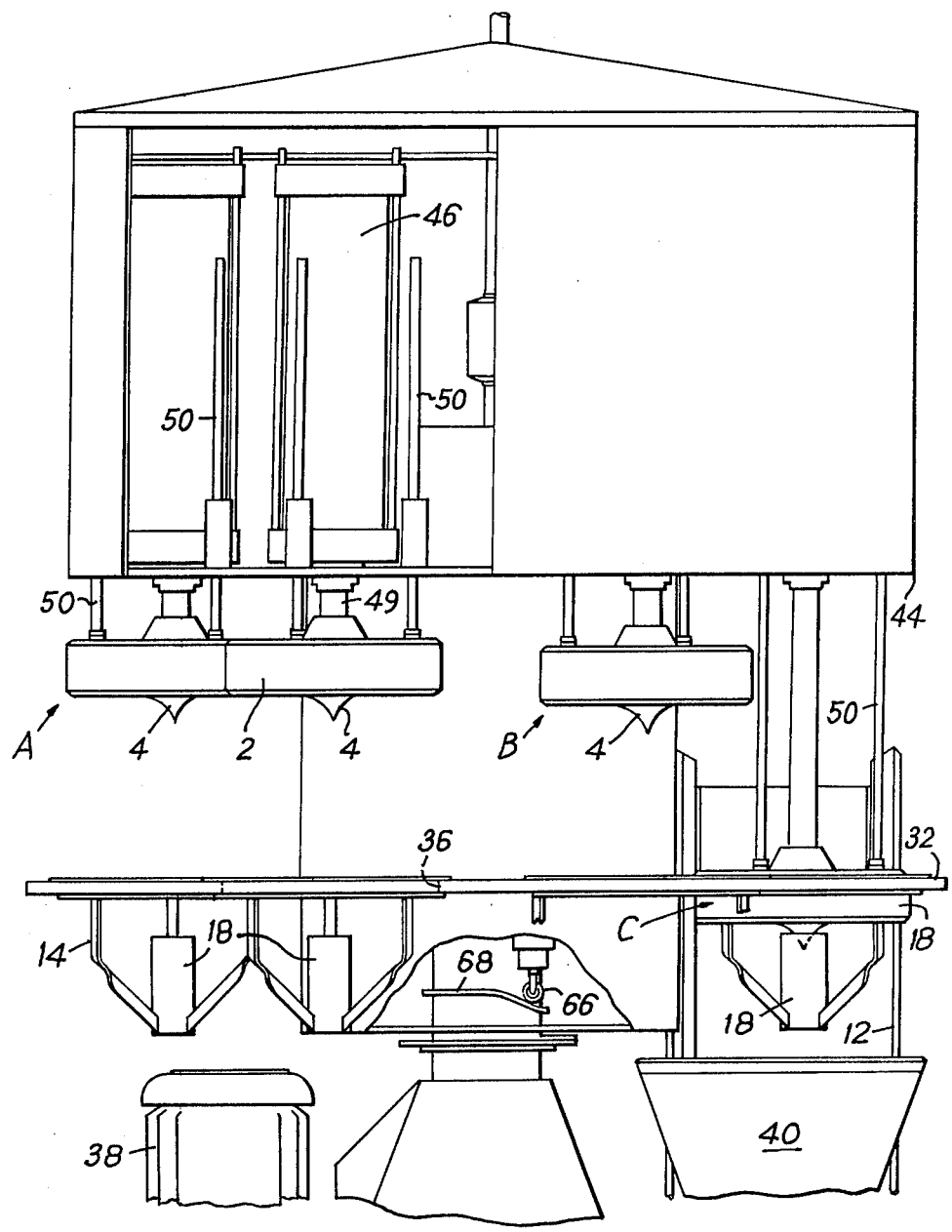
FIGS. 3 and 4 show a plurality of such apparatus mounted in a continuous production machine, FIG. 4 being a plan view.

FIG. 3 shows a machine suitable for mounting a plurality of cutter members and dividers for use in a continuous process.

The machine comprises a rotary table 32 provided with six vegetable-receiving localities, each provided with an aperture 36 large enough to accommodate in the present example a large-size cauliflower.

The rotary table is arranged for rotation by means of a motor 38. The machine is loaded from the left as viewed in the Figure, preferably by two operators who load alternate localities with cauliflowers in a stalk-down position.

At a position approximately diametrically opposed to the loading a discharge station allows florets to be collected in a hopper 40. Other means (not shown) are arranged to collect the core of each cauliflower. These means comprise a stationary blanking-off plate, lying immediately beneath the discharge station, which has sufficient length to effectively close off the tubular body portion 18 of each cutting member in its path away from the discharge station, until it is well spaced therefrom, whereupon the cores are released.

Concentrically arranged above the table 52 is a circular housing 44 enclosing six piston-and-cylinder arrangements 46 each controlling the heightwise movement of one of six divider members 2, one such member being provided at a position immediately above an associated one of the produce receiving localities. The housing 44 and the members 2 are mounted for rotation with the rotary table 32. Each divider member 2, which is mounted on a head portion of a piston rod 49 of its associated piston-and-cylinder arrangement 46, is circular, having a diameter slightly less than that of the aperture 36 of the associated locality. Guide rods 50 ensure the vertical descent of each divider member.

Spanning each aperture 36 is a cutting member as shown in FIG. 1.

Figure 4:
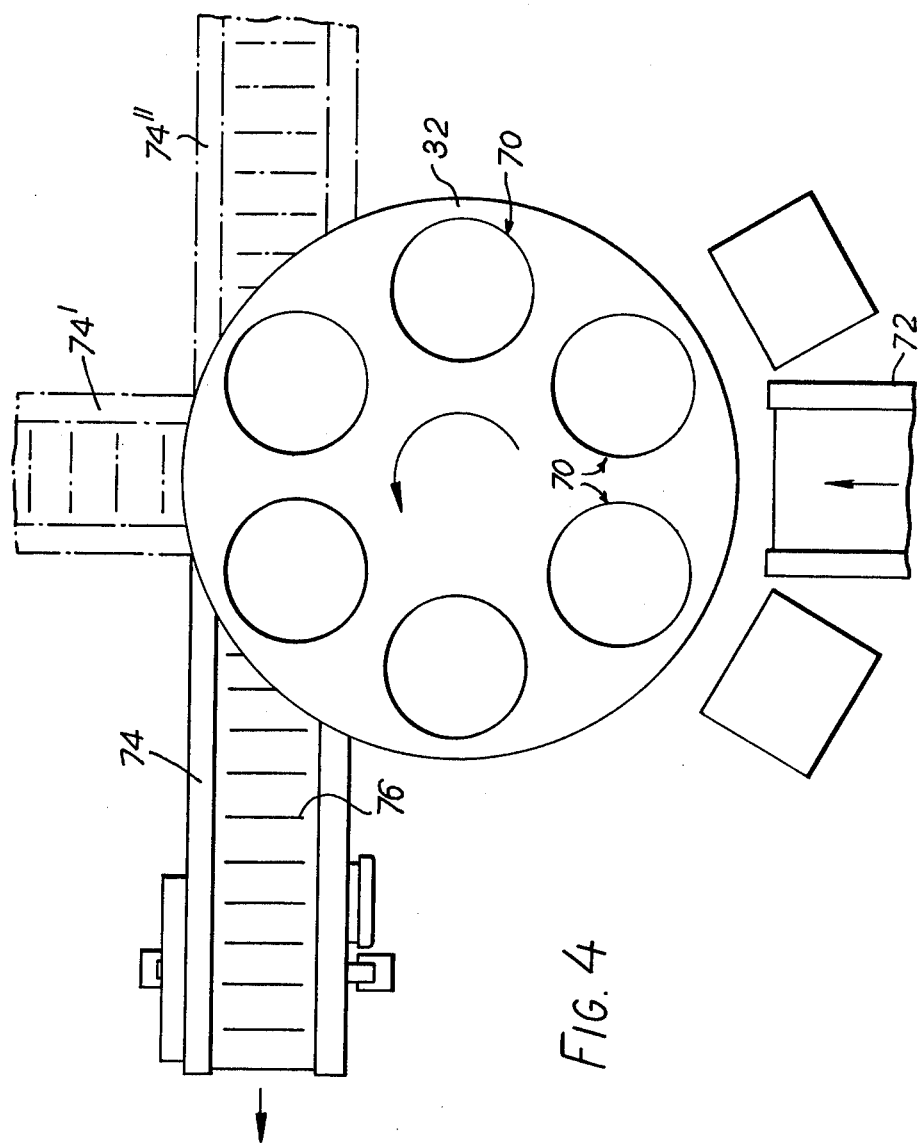

The rotary table 32 is arranged for rotation in the direction shown by the arrow in FIG. 4 by means of a motor 38 (FIG. 1). To one side of the machine is arranged a loading station at which sit two operators who each load alternate localities 70 with produce supplied by a conveyor 72. In this way sixty cauliflowers may be fed to the machine per minute.

As the aperture 36 of each locality 70 progresses from the loading station towards the discharging station the member 2 above it remains in a raised, inoperative position, A, until the discharging station is approached whereupon the member 2 descends through position B to contact the cauliflower and to press it against the cutting edge 16 so that the cauliflower is penetrated by the blades and the florets are removed as it is pushed through the aperture 36 to arrive at position C. The divider member 2 shown on the far right hand side of FIG. 1 is shown in this lowest position C in which a cutting operation has been completed. It is arranged in the present example that the heightwise movement of each divider member takes place during its rotary movement through an angle of 45° of the rotary table 32.

At a position approximately diametrically spaced from the loading station there is provided a discharging station at which an inclined conveyor 74 is provided to carry away the cut vegetable portions. The conveyor 74 may be at any convenient take-off angle such as that shown in FIG. 4 in broken lines at 74' or 74".

When the segmented cauliflower has passed through the aperture 36, it drops into the hopper 40, which has an open lower portion through which the segments are fed onto the conveyor 74. This conveyor is arranged at an inclined angle and is provided with flights 76, to return the segments to a convenient height for the next stage of processing.

The control of the heightwise movement of the divider members 2 is achieved by opertion of the piston-and-cylinder arrangements 46, and the action of these arrangements is initiated by cam means. Mechanical valves are chosen in preference to electrically operated ones in the interests of safety and these valves are operated only when the divider member approaches the discharging station by movement of a cam follower 66, connected by suitable means to one of the divider members, in a non-rotatable cam track 68 mounted on a stationary portion of the machine. Thus the valve controlling each divider member 2 can only be initiated when the divider member is right away from the loading station and from the proximity of operators' hands.

Figure 5:
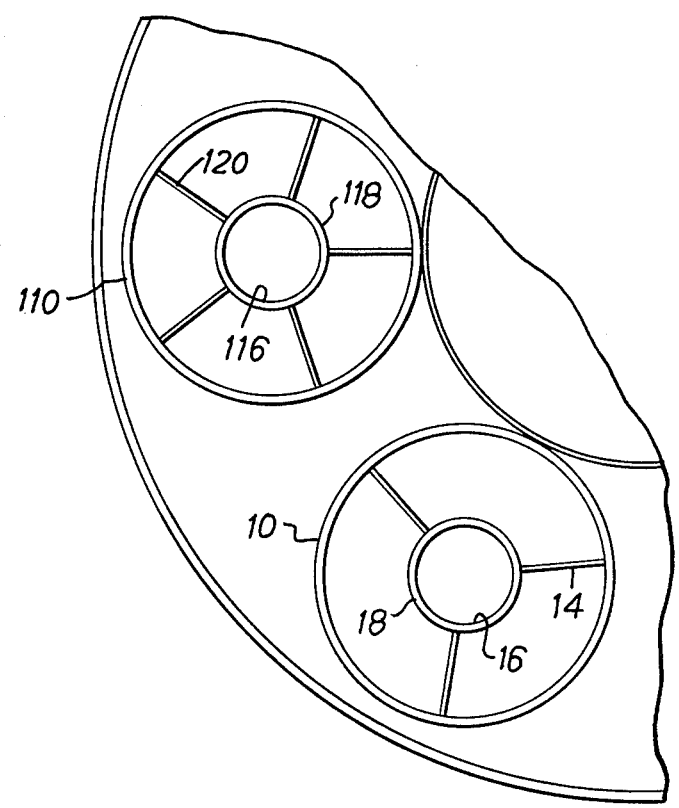
FIG. 5 is a fragmentary plan view of a rotary table of the machine, showing two alternative forms of cutter member.

FIG. 5 shows a fragmentary plan view of the rotary table 32 including two cutting members. One cutting member 10 is identical with that shown in the previous Figures, but the other cutting member 110 has a similar tubular body portion 118 with a cutting edge 116, but also includes radially extending cutting edges 120 spanning the cutting member at approximately the same level as the cutting edge 116. This alternative form of cutter member is particularly suitable for use with cabbages. It is convenient if the cutting edges 116 and 120 form a dished profile to aid in centralised positioning of the cabbage on the cutter member 110.

We claim:

1. Apparatus for the treatment of agricultural produce having a central stalk or core bearing leaves, florets or the like, comprising:

a cutting member comprising an annular cutting edge surrounding an opening defined by said annular edge for receiving said central stalk or core;

a divider member having a surface having a projection extending therefrom and rigidly mounted thereon for movement therewith;

means for positioning said divider member so as to confront said opening in said cutting member;

said projection being substantially circular in plan and comprising a central raised point portion extending towards said opening and concave side portions sloping concavely outwardly and rearwardly from said point portion to said surface from which said projection extends;

means for moving said cutting member and divider member relatively towards one another along a path lying parallel to the longitudinal axis of said annular cutting edge of the cutting member, an extension of said axis passing through said raised portion of said divider member, whereby, in use, an item of produce having a cut stalk or core end positioned between said divider member and cutting member with the cut end adjacent said opening of said cutting member is moved relative to said cutting member with said divider member to cause the cutting member to progress through said produce item from the cut end thereof to remove the leaves, florets, or the like, while the raised point and concave sloping side portions of said projection extending from said surface of said divider member divide and deflect the leaves, florets, or the like, at a region opposed to said cut end to cause the deflected leaves, florets, or the like, to lie substantially radially of said axis for cutting by said cutting member.

2. Apparatus according to claim 1 further including means preventing relative rotation of said divider member and said cutting member.

3. Apparatus according to claim 1 wherein further cutting edges are provided on said cutting member extending radially outwardly of said annular cutting edge.

4. Apparatus according to claim 1 wherein a plurality of assemblies of cutting members and divider members are mounted on a conveyor means capable of transferring vegetables during treatment by the apparatus between a loading station and a discharge station.

5. Apparatus according to claim 4 wherein the conveyor means comprises a rotary table.

6. Apparatus according to claim 4 wherein conveyor means are provided respectively to bring vegetables to the loading station and to remove treated vegetable portions from the discharge station.

* * * * *